US007106333B1

(12) United States Patent
Milinusic

(10) Patent No.: US 7,106,333 B1
(45) Date of Patent: Sep. 12, 2006

(54) SURVEILLANCE SYSTEM

(75) Inventor: Tomislav F. Milinusic, Decatur, GA (US)

(73) Assignee: Vistascape Security Systems Corp., Atlanta, GA (US)

( * ) Notice: Subject to any disclaimer, the term of this patent is extended or adjusted under 35 U.S.C. 154(b) by 507 days.

(21) Appl. No.: 10/079,639

(22) Filed: Feb. 19, 2002

Related U.S. Application Data

(60) Provisional application No. 60/317,635, filed on Sep. 6, 2001, provisional application No. 60/269,434, filed on Feb. 16, 2001, and provisional application No. 60/269,676, filed on Feb. 16, 2001.

(51) Int. Cl.
*G06T 13/00* (2006.01)

(52) U.S. Cl. ........................ 345/474; 345/473; 348/152; 348/153; 348/154; 348/155

(58) Field of Classification Search ................. 345/473, 345/474; 348/143, 159, 154, 152, 153, 155; 382/168
See application file for complete search history.

(56) References Cited

U.S. PATENT DOCUMENTS 6,069,655 A * 5/2000 Seeley et al. ............... 348/154

* cited by examiner

*Primary Examiner*—Kimbinh T. Nguyen
(74) *Attorney, Agent, or Firm*—Morris, Manning & Martin, LLP

(57) ABSTRACT

A system is provided for collecting surveillance data from one or more sensor units and incorporating the surveillance data into a surveillance database. The system is configured to retrieve surveillance data from the surveillance database and perform predetermined analytical functions on the data. The system is also configured to present surveillance data and the results of data analysis in one or more predetermined formats.

21 Claims, 4 Drawing Sheets

SURVEILLANCE SYSTEM

CLAIM OF PRIORITY

This application claims priority to co-pending U.S. provisional application entitled, "SCANNING CAMERA AND SURVEILLANCE SYSTEM," having Ser. No. 60/269,434, and filed Feb. 16, 2001; U.S. provisional application entitled, "SURVEILLANCE CAMERA SYSTEM," having Ser. No. 60/269,676, and filed on Feb. 16, 2001'; and U.S. provisional application entitled, "SURVEILLANCE SYSTEM," having Ser. No. 60/317,635, ad filed on Sep. 6, 2001, the disclosures of which are all entirely incorporated herein by reference.

TECHNICAL FIELD

The present invention is generally related to a surveillance system and more particularly, to a system for collection, analysis and distribution of surveillance data.

BACKGROUND OF THE INVENTION

Systems designed to monitor predetermined areas, places or objects are known. These systems often incorporate video cameras that provide a continuous feed of video data that is either displayed in real time on a display device and/or recorded to a recording device, such as a video tape recorder. While these systems provide for capture and recordation of video data depicting the conditions and/or occurrences within the monitored area, they do not provide a means of easily determining when and where an occurrence or condition has taken place. Nor do they provide for any means of analyzing the information depicted by the video data.

Further, as video data requires substantial recording media space for storage, it is common for video data to be recorded and archived for only a very limited period of time. Thus, once the period of archiving has expired, the video data is either recorded over or otherwise erased from the recording media. Further, known systems do not provide for any type of analysis of video data that would allow for a determination of, for example, how long an intruder has been in a monitored area; whether the intruder is alone; how the intruder got into the monitored area; where the intruder has previously been; what the intentions of the intruder might be or, where the intruder may be going to next.

SUMMARY OF THE INVENTION

The present invention provides a system for collecting and distributing surveillance data collected via one or more sensor units. Briefly described, in architecture, one embodiment of the system can be implemented as follows. Memory is provided. A surveillance database is provided that is stored on the memory. The surveillance database includes surveillance data collected by a surveillance sensor unit. A surveillance server is provided that is associated with the memory and is configured to receive surveillance data from a surveillance sensor unit that is configured to detect predetermined conditions and to generate surveillance data representative of the detected conditions.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
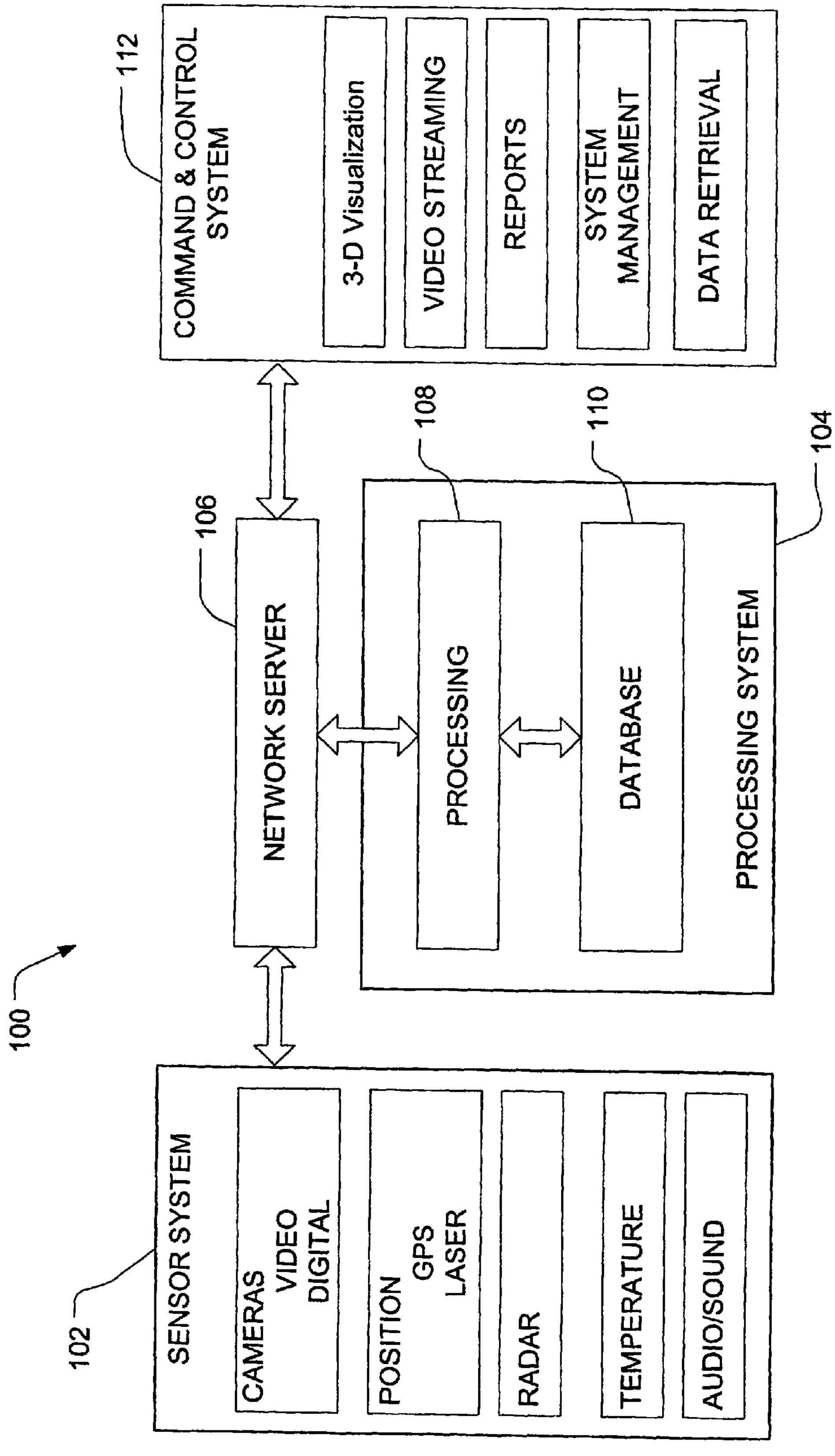
FIG. 1 is a block diagram illustrating a surveillance system 100.

FIG. 1 is a block diagram representative of an embodiment of a surveillance system 100. The surveillance system 100 is structured to include a sensor system 102, a processing system 104, a network server 106 and a command and control system 112.

Sensor system 102 may include any type of detection or sensing device. Sensor system 102 may include one or more detection or sensing devices. Some examples of detection/sensing devices are: cameras, such as video or digital cameras; position sensors, such as global satellite positioning system (GPS) compliant receivers or transceivers, laser measurement devices and triangulation based positioning systems; radar, temperature detectors and the like. Further examples of detection/sensing devices include audio devices responsive to sound. These devices may be configured to capture audio data. The detection devices of sensor system 102 may be configured to capture and record captured data or to capture and transmit captured data to an intended receiving system or device. This captured data may be transmitted along with position data, such as ground coordinate data, as well as time data that may also be generated by the detection devices of the sensor system 102.

Processing system 104 includes systems for receiving, compiling and storing data received from sensor system 102. It includes processing unit 108 and database unit 110. Processing system 104 is also configured to retrieve data and distribute it according to input from command and control system 112.

Network server 106 may be configured to receive data from sensor system 102. It may also be configured to distribute data from processing system 104 in accordance with instructions/commands received from command and control system 112.

Command and control system 112 is configured to provide for control and management of surveillance system 100. Command and control system 112 may be configured to initiate retrieval of data from processing system 104 and to present data as, for example, representative 3-D visualizations based upon data received from processing system 104. It may also provide for presentation of video or audio data in a streaming format. Further, it may be configured to generate predetermined reports.

Figure 2:
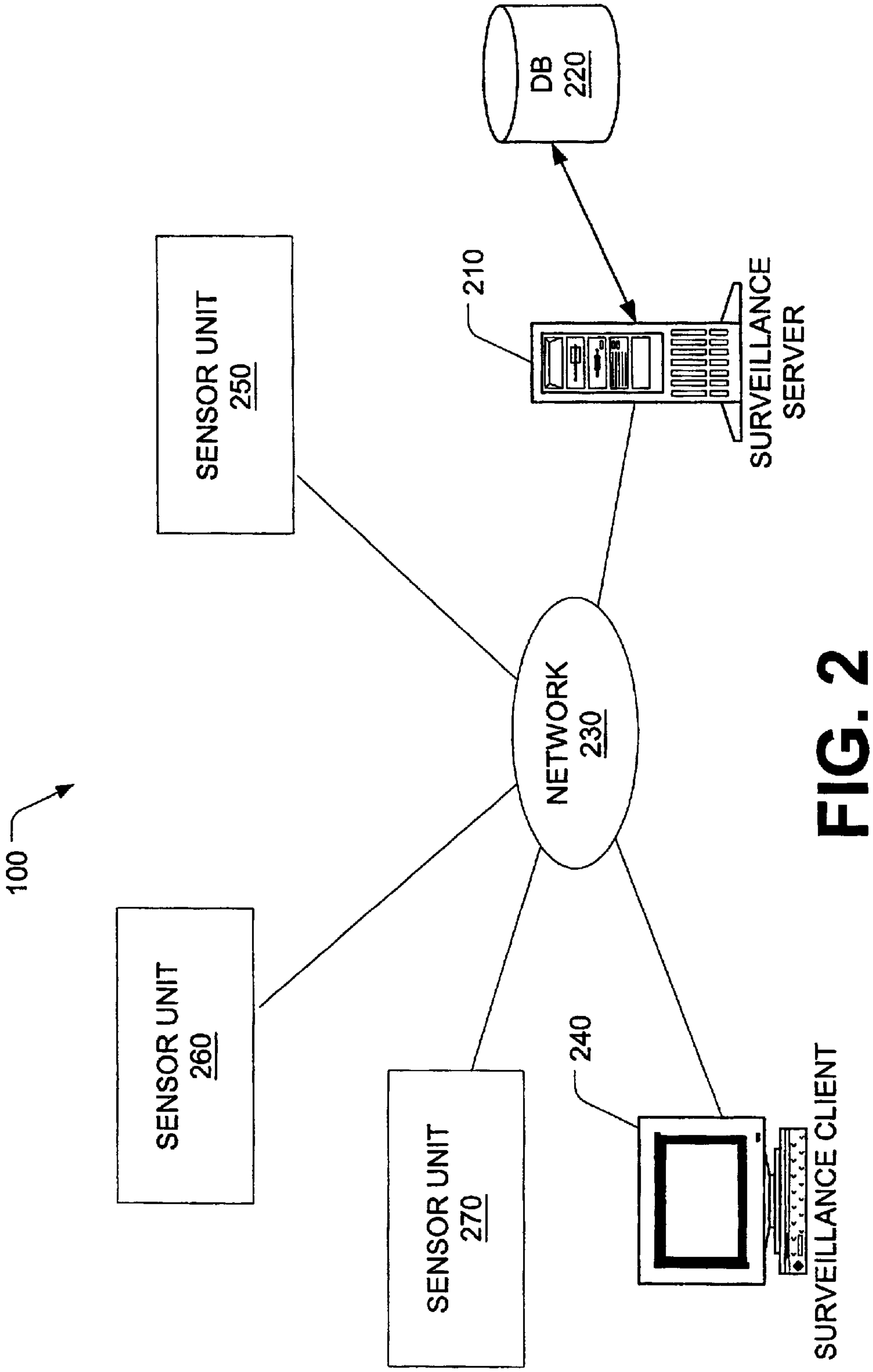
FIG. 2 is a block diagram further illustrating the structure of surveillance system 100.

FIG. 2 is a block diagram illustrating a further embodiment of a surveillance system 100 according to the present invention. The surveillance system 100 may include a surveillance server 210 that is connected to a network 230. Surveillance server 210 is associated with a database 220. A surveillance client 240 is provided and is connected to the network 230. A sensor unit 250, a sensor unit 260 and a sensor unit 270 are also provided. Each of sensor units 250, 260 and 270 are connected to the network 230. Each of the sensor units 250, 260 and 270 are configured to collect surveillance data. More particularly, the sensor units are configured to detect predetermined conditions or occurrences and generate surveillance data representative of the detected conditions or occurrences.

Database 220 may be stored on a memory device that is directly connected to the surveillance server 210 as shown. Alternatively, database 220 may be stored on a memory device that is connected to the network 230 and accessible to the surveillance server 210 via network 230. Database 230 may be configured to include surveillance data received from, for example, sensor units 250, 260 and/or 270. Surveillance data may include, video data, still image data, audio data, position or location data, radar data, temperature data, as well as time data representative of, for example, the time at which surveillance data was collected by a respective sensor unit.

Network 230 may be a wide area network (WAN), such as, for example, the Internet, or a local area network (LAN). Each of the sensor units 250, 260 or 270 may be connected to the network 230 via an interface (not shown), such as a wireless or wired interface. Some examples of suitable wireless interfaces include, but are not limited to, radio frequency (RF) wireless interfaces or infrared (IR) interfaces. Other suitable interfaces may include data acquisition units (DA Units) such as those described in co-pending U.S. patent application entitled "DATA ACQUISITION SYSTEM," filed on Mar. 13, 2001 and accorded Ser. No. 09/805,229, the disclosure of which is hereby incorporated herein in its entirety.

Surveillance client 240 may be implemented, for example, as a general-purpose computer or personal computer. Further, it may be implemented as a personal digital assistant (PDA) such as the Palm Pilot. Surveillance client 240 is preferably configured to allow a user to retrieve surveillance data or specified reports by issuing a request to surveillance server 210. Surveillance client 240 may also be configured to control or adjust specified sensor units via issuing requests to surveillance server 210 that are then transmitted to the specified sensor unit.

Sensor units 250, 260 and 270 are configured to collect surveillance data by detecting predetermined conditions or occurrences and generating and outputting surveillance data representative of the detected conditions or occurrences. Surveillance data may be transmitted to, for example, the surveillance server 210 via the network 230. The sensor units 250, 260 and 270 may be, for example, cameras, such as for example, a digital camera, or video camera configured to be responsive to, for example, the visible light spectrum or infrared radiation (IR). Further, sensor units 250, 260 and 270 may also be configured as position sensing devices, such as, for example, global positioning satellite (GPS) receiver or GPS transceiver; a radar receiver, sonar receiver, temperature detector, motion detector and/or distance detection devices. They may also be audio detection devices such as microphones or the like, that are capable of capturing audio/sound.

Figure 3:
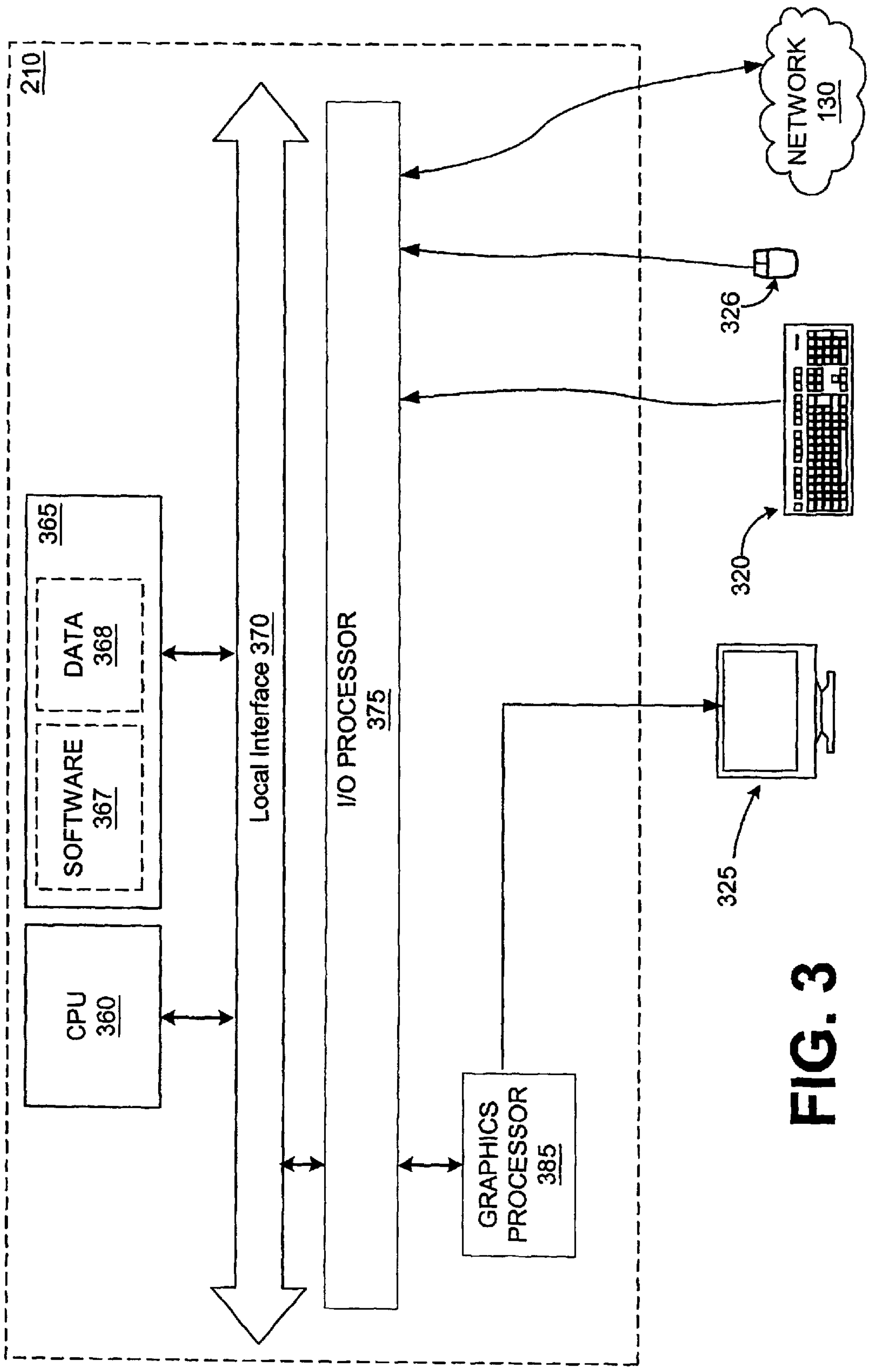
FIG. 3 is a block diagram illustrating an embodiment of surveillance server 210.

FIG. 3 is a block diagram of an embodiment of a surveillance server 210 according to the present invention. Surveillance server 210 is preferably configured to receive surveillance data from the various sensor units 250, 260 and 270 (FIG. 2) and to incorporate collected surveillance data into the database 220 (FIG. 2). It is also preferably configured to retrieve and distribute surveillance data to a requesting surveillance client. It may also be configured to analyze and/or distribute surveillance data to a surveillance client based upon predetermined distribution criteria. Further, surveillance server 210 may be configured to determine such things as how long a detected occurrence or condition has existed, whether there are other similar occurrences or conditions that exist, as well as what preceded the detected occurrence or condition. It may also be configured to predict future conditions or occurrences based upon detected conditions or occurrences. The surveillance server 210 may be configured to generate and display a three dimensional model of an area under monitor based upon the data stored in database 220. This model can then be used to analyze detected conditions or occurrences within the monitored area.

In this embodiment, surveillance server 210 includes a central processing unit 360, storage memory 365 for storing data 368 and/or software 367. An input/output (I/O) processor 375 is provided for interfacing with associated input and output devices. A local interface 370 is provided for transferring data between the CPU 360, memory 365 and/or I/O processor 375. A graphics processor 385 is provided for processing graphical data. Associated input and output devices may include keyboard device 320, mouse/pointing device 326 and/or a network 130.

CPU 360 is preferably configured to operate in accordance with software 367 stored on memory 365. CPU 360 is preferably configured to control the operation of server 210 so that surveillance data may be received from the various sensor units 250, 260 and 270 (FIG. 2) and incorporated into the surveillance database 220 (FIG. 2). It is also preferably configured to retrieve and distribute surveillance data to a requesting surveillance client 240 or based upon predetermined distribution criteria. Further, it may also be configured to determine duration of detected occurrences and preceding conditions or occurrences. It may also be configured to predict future conditions or occurrences based upon detected conditions or occurrences represented by surveillance data stored in the surveillance database 220.

The processor 385 and/or CPU 360 of the present invention can be implemented in hardware, software, firmware, or a combination thereof. In the preferred embodiment(s), the processor 385 is implemented in software or firmware that is stored in a memory and that is executed by a suitable instruction execution system. If implemented in hardware, as in an alternative embodiment, the processor 385 and/or CPU 360 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc. Processor 385 may be implemented as a general-purpose processor, such as, for example the Intel™ Pentium™ IV central processing unit. Further, processor 385 may be implemented as a graphics processor or a digital signal processor (DSP).

The processor 385 may be configured to incorporate or otherwise carry out the functions of CPU 360. CPU 360 may also be configured to incorporate or otherwise carry out the functions of processor 385.

The software 367 comprises a listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 4:
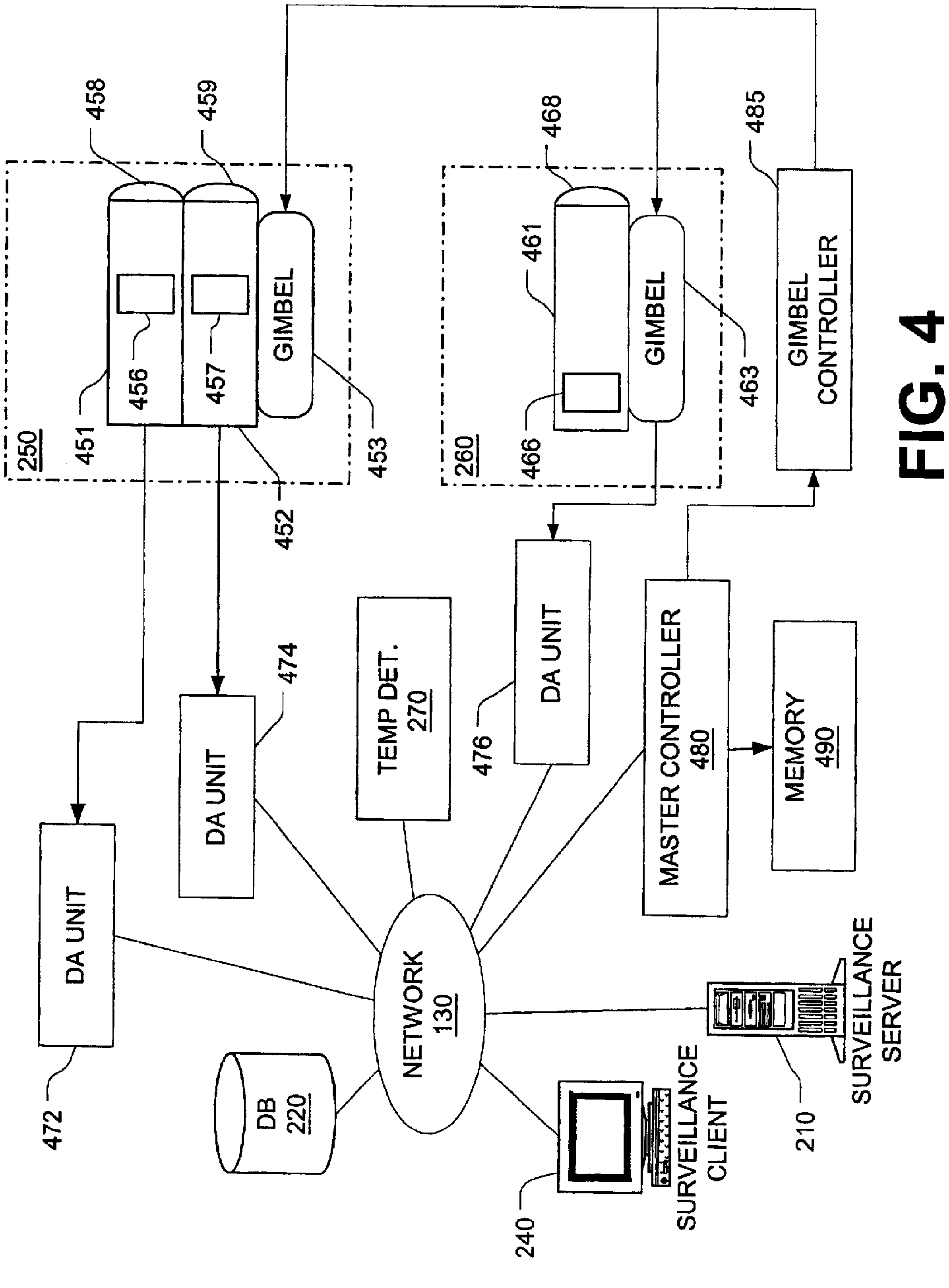
FIG. 4 is a block diagram illustrating a further embodiment of surveillance system 100.

FIG. 4 is diagram illustrating a further embodiment of system 100 in which sensor units 250 and 260 are cameras and sensor unit 270 includes a temperature detection device. Sensor unit 250 is configured, as a visual spectrum sensitive camera 451 and an infrared radiation (IR) sensitive camera 452. The cameras 451 and 452 each preferably incorporate wide-angle optics (lens 458 and 459) to allow for viewing and/or capture of a wide field of view. The IR camera 451 includes an imager 456 that is preferably sensitive to IR. The visual spectrum camera 452 includes an imager 457 that is preferably sensitive to the visible light spectrum.

Sensor unit 260 is configured as an IR sensitive camera 461. The camera 461 preferably incorporates telephoto optics to allow for close-up monitoring and/or capture of an area or objects within an area, from a greater distance. The IR camera 461 includes an imager 466 that is preferably sensitive to IR. It will be recognized that sensor unit 260 may also be configured as a visual spectrum sensitive camera. Similarly, it may be configured to include both IR and visual spectrum cameras.

Sensor unit 270 is configured as a temperature detection device. Sensor unit 270 may include a thermometer as well as smoke or carbon monoxide detection sensors.

In this example, imagers 456, 457 and 466 are preferably photo multiplier tubes (PMT). However, other types of imagers may also be used depending on the particular application at hand, including, but not limited to, charged coupled device (CCD) imagers or complementary metal oxide (CMOS) imagers.

Sensor units 250 and 260 are preferably configured to monitor a predetermined area. The cameras 451, 452 and 461 are configured to capture an image of the area and objects within the area and to generate and output image data representative of the area/objects. Image capture may be set to occur at predetermined times or upon the occurrence of predetermined occurrences, such as the detection of movement within the area being monitored by the sensor units 250 or 260. Sensor units 250 and 260 may be configured so as to be associated with a position-sensing device (PSD) that determines the position of, for example, the sensor unit, or an object or occurrence within the area being monitored by the sensor unit. The PSD will generate position data representative of the determined position of the object or occurrence.

Suitable PSD's may include global satellite positioning (GPS) receivers or transceivers, laser distance detection systems or position detection systems that use multiple sensor units of known location to calculate the location of the detected change/movement via triangulation techniques. Further, suitable PSD devices include those disclosed and described in co-pending U.S. patent application entitled "AN IMMERSIVE CAMERA SYSTEM," filed on Apr. 18, 2001 and accorded Ser. No. 09/837,916; and co-pending U.S. patent application entitled "A SCANNING CAMERA SYSTEM," filed on Apr. 18, 2001 and accorded Ser. No. 09/837,915, the disclosures of which are both hereby incorporated herein in their entirety.

Each of the sensor units 250, 260 and 270 may be configured to include one or more detection devices. Detection devices may be of the same type or different types. For example, sensor unit 250 may be configured to include a digital camera sensitive to IR and a camera sensitive to the visible light spectrum. It may also be configured to include a position sensing device for detecting the position of a detected occurrence or condition.

Image data generated and output by the cameras units 250 and 260 may include position data representative of the position of the camera, the position of the area and/or the position of an object or objects within the area, as well as detected changes within the area. Position data may be generated by a position-sensing device (PSD) associated with the sensor unit 250 or 260.

Surveillance data is preferably output from the cameras 451, 452 and 461 and transmitted to data acquisition units (DA) 472, 474 and 476 that are provided for each camera 451, 452 and 461, respectively. In turn, surveillance data is transferred over the network 130 to surveillance server 210, which in turn causes the surveillance data to be incorporated into database 220.

Sensor units 250 and 260 may be supported and positioned by associated gimbals 453 and 463, respectively. One gimbal is preferably provided for each camera 451, 452 and 461. Alternatively, one gimbal may be provided for each sensor unit 250 and 260. In FIG. 4, gimbal 453 is associated with sensor unit 250 and gimbal 463 is associated with sensor unit 260. Each gimbal 453 and 463 is preferably mounted to a support device of some type, such as, for example, a tripod, concrete wall, building or other structure capable of providing support. Each gimbal 453 and 463 is adjustable about two axes of rotation (X-axis and Y-axis) and is preferably responsive to a control signal from a control device such as gimbal controller 485. By controlling the gimbal, the position of the sensor unit 250 or 260 may be moved about the x-axis and y-axis.

Surveillance data may include pixel data representative of the image captured by the camera. This pixel data may be stored into database 220. The database 220 may be configured to include pixel data representative of the captured image, as well as, position data representative of the position (x, y and z) of the area/object represented by, the pixel data.

Additionally, the database 220 may be configured to include a time stamp indicative of the time at which the pixel data was captured, stored and/or changed. This time data may be generated by, for example, the sensor unit 250 or 260, or via master controller 480. It may also be generated by surveillance server 210.

The database 220 may be configured to include reference data representative of, for example, a base image representative of a predetermined view of the area being monitored. This predetermined view might be, for example, an image of the area in a typical state. For example, where the area is that of a warehouse interior area, the base image might be an image of the warehouse interior during non-business hours when no personnel are present and no activities are taking place (i.e. no changes in the area are occurring).

As an example of the operation of the present invention, consider the following. The sensor unit 250 is configured to monitor a predetermined area, such as for example, a railroad-switching yard. The sensor unit 250 is further configured to detect any changes in the area and capture an image of the changes within the area. These changes will typically represent movement of objects within the area being monitored. Once these changes are detected image data representing an image of the area/objects are output via the DA unit 474 and subsequently recorded to the database 220.

Additionally, the location of the detected changes/movements is determined by sensor unit 250. This may be done via, for example, a laser distance detection system or via triangulation techniques wherein multiple sensor units of known location are used to calculate the location of the detected change/movement. In one embodiment, master controller 480 is configured to carry out calculations for determining the position of the detected change/movement in the monitored railroad yard based upon input from relevant position sensing devices (not shown) associated with the sensor unit 250.

Once the location of the change/movement has been determined, telephoto camera 461 may be engaged to "zoom-in" on the detected changes to obtain a closer view of the changes/movements at the determined location. Camera 461 may also be configured to capture an image of the area/objects at the location of the detected changes within the monitored railroad yard and to output image data representative of the area/objects. Subsequently, this image data can be recorded to the database 220, along with position data indicative of the location of the detected changes and time data representative of the time of the image capture of the changes.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A surveillance management system for controlling at least one position-controllable surveillance device in response to processed surveillance data, comprising:

a sensor system including the at least one position-controllable surveillance device and configured to detect predetermined conditions and generate surveillance data in response thereto, said surveillance data including position data;

a processing system configured to receive said surveillance data and incorporate said surveillance data into a surveillance database;

a control and command system operative to retrieve predetermined position data from said surveillance data in said surveillance database and to generate a position control signal in accordance with said position data, and a position-controllable surveillance device responsive to said control signal for adjusting the position of the surveillance device.

2. The system of claim 1, wherein said control and command system is further configured to generate and output reports based upon said surveillance data.

3. The system of claim 1, wherein said control and command system is further configured to distribute said surveillance data over a network.

4. The system of claim 1, wherein said control and command system is further configured to generate graphical representations for display on a display device, based upon said surveillance data.

5. The system of claim 1, wherein said sensor system comprises a sensor unit.

6. The system of claim 5, wherein said sensor unit is configured to detect predetermined conditions and to generate surveillance data representative of the detected conditions.

7. The system of claim 6, wherein said surveillance data comprises data indicative of the time said conditions where detected.

8. The system of claim 6, wherein said surveillance data comprises data indicative of the location of said detected conditions.

9. A surveillance management system for providing a position control signal usable by a position-controllable surveillance device comprising:

a memory;

a surveillance database stored on said memory;

said surveillance database operative for storing surveillance data collected by a surveillance sensor unit, said surveillance data including position data; and a surveillance server associated with said memory and configured to receive surveillance data including said position data from a surveillance sensor unit configured to detect predetermined conditions, to generate surveillance data representative of the detected conditions, and to generate a position control signal for utilization by said position-controllable surveillance device.

10. The system of claim 9, wherein said surveillance server is further configured to incorporate surveillance data received from said surveillance sensor unit into said surveillance database.

11. The system of claim 10, wherein said surveillance data comprises data indicative of the time said predetermined conditions were detected.

12. The system of claim 11, wherein said surveillance data comprises data indicative of the location where said predetermined conditions were detected.

13. The system of claim 12, wherein said surveillance data comprises data representative of said detected conditions.

14. The system of claim 12, wherein said surveillance data comprises video data representative of said detected conditions.

15. The system of claim 9, wherein said surveillance sensor unit comprises a detection device.

16. The system of claim 9, wherein said surveillance sensor unit comprises a plurality of detect ion devices.

17. The system of claim 15, wherein said detection device comprises a cam era.

18. The system of claim 17, wherein said camera is responsive to the visible light spectrum.

19. The system of claim 17, wherein said camera is responsive to infrared radiation (IR).

20. The system of claim 17, wherein said camera comprises a video camera.

21. The system of claim 15, wherein said dejection device comprises a position detection device.

* * * * *